United States Patent [19]

Belart et al.

[11] Patent Number: 4,626,043

[45] Date of Patent: Dec. 2, 1986

[54] SLIP-CONTROLLED BRAKE SYSTEM FOR AUTOMOTIVE VEHICLES WITH A DRIVEN AXLE

[75] Inventors: Juan Belart, Walldorf; Helmut Fennel, Frankfurt am Main; Wolfram Seibert, Darmstadt; Ivica Batistic, Frankfurt am Main, all of Fed. Rep. of Germany

[73] Assignee: Alfred Teves GmbH, Frankfurt am Main, Fed. Rep. of Germany

[21] Appl. No.: 706,099

[22] Filed: Feb. 27, 1985

[30] Foreign Application Priority Data

Mar. 1, 1984 [DE] Fed. Rep. of Germany ....... 3407538

[51] Int. Cl.$^4$ ................................................ B60T 8/02
[52] U.S. Cl. .................................. 303/114; 303/116; 303/119
[58] Field of Search ............... 303/113, 114, 115, 116, 303/117, 118, 119, 110, 111; 188/181 R, 181 A; 180/197

[56] References Cited

U.S. PATENT DOCUMENTS 3,578,820 8/1969 Riordan ............................... 303/114
4,170,066 10/1979 Blomberg et al. .................. 303/114
4,418,966 12/1983 Hattwig ............................... 303/119

FOREIGN PATENT DOCUMENTS 2424217 11/1975 Fed. Rep. of Germany ...... 303/119
2086509 5/1982 United Kingdom ................ 303/116

Primary Examiner—Douglas C. Butler
Assistant Examiner—Alvin Oberley
Attorney, Agent, or Firm—James B. Raden; William J. Michals

[57] ABSTRACT

A slip-controlled brake system for automotive vehicles with a driven axle and a non-driven one has a braking pressure generator (10) connected to an auxiliary pressure source (9), to the braking pressure generator (10) the wheel brakes of a front wheel (VR, VL) and of a rear wheel (HR, HL) are connected by way of two separate pressure medium circuits. The braking pressure in the two circuits (I, II) at first is jointly controlled by means of an inlet valve and an outlet valve each (5, 13 and 7, 14 respectively). However, a far-reaching decoupling of the pressure variation in the two wheel brakes connected to one circuit (I or II, respectively) is achieved by means of additional 2/2-way valves (6, 15) in the pressure medium line towards the wheel brakes of the non-driven wheels (HR, HL).

3 Claims, 2 Drawing Figures

SLIP-CONTROLLED BRAKE SYSTEM FOR AUTOMOTIVE VEHICLES WITH A DRIVEN AXLE

BACKGROUND OF THE INVENTION

This invention relates to a slip-controlled brake system for automotive vehicles with a driven axle and a non-driven one. The brake system has a braking pressure generator connected to an auxiliary pressure source. The wheel brakes of a front wheel and of a rear wheel are connected to the braking pressure generator by way of two separate pressure medium circuits. The brake system includes wheel sensors and electonic circuits for the detection of the rotational behavior of the wheels as well as of the vehicle's velocity and for the generation of braking pressure control signals. The brake system is equipped with a normally open inlet valve each in the pressure medium line leading from the braking pressure generator to the two associated wheel brakes and with a normally locking outlet valve which after switching-over into the open position connects the pressure medium line which leads to the two wheel brakes with a pressure compensation reservoir.

Brake systems of this type are known where the wheels are connected to a braking pressure generator by way of two separate pressure medium circuits. In these systems, the allocation of the wheels to the brake circuits may be diagonal or it is possible to connect the righ-hand wheels to one circuit, the left-hand wheels being connected to the other circuit.

Contrary to systems with three brake circuits or even with individual slip control at each wheel, in such simplified brake systems only a joint control of the braking pressure is possible at one front wheel and at the associated rear wheel—i.e., at the rear wheel connected to the same circuit. In many situations this does not lead to any disadvantage compared with systems with independent bracking pressure control at the individual wheels. In case of some road conditions and driving situations it is more advantageous to control the braking pressure in accordance with the rotational behaviour of the front wheel; in other cases it will be more advantageous to control in accordance with the rotational behavior of the rear wheel. Under certain conditions, such as on icy roads, the control should even permit one of the two wheels to lock.

Further, it is known to install pressure reducers in the pressure medium line leading to the rear wheel as, due to the dynamic axle load shift, a higher braking pressure often is required at the front axle. For the same reason it will often be advantageous for the control quantity for the rating of the braking pressure to be derived from the front wheel. It has also been suggested to effect a switching-over in accordance with certain criteria so that temporarily the rear wheel instead of the front wheel governs or determines the braking pressure.

In some cases, however, the joint control of the braking pressure of the two wheels connected to one pressure medium circuit will be disadvantageous as compared with systems featuring individual control. It is thus an object of this invention to overcome this disadvantage and to provide a brake system which is limited to two pressure medium circuits with diagonal or right-and-left braking force allocation and in which, nevertheless, the pressure variation at the front and rear wheels of one pressure medium circuit is decoupled as far as possible in order to enable the slip control to be adapted to the varying road and driving conditions. Further, for the purpose of controlling the traction slip it should be possible to supply braking pressure to the driven wheels, only.

SUMMARY OF THE INVENTION

It has been found out that this object can be solved simply and economically compared with the known dual-circuit brake systems in that in each brake circuit of a slip-controlled system of the type referred to above a normally open multi-directional valve (for example, a 2/2-way valve) is inserted into the pressure medium line leading to the wheel brake of the non-driven wheel, after switching-over the normally open multi-directional valve locking the pressure medium line.

In accordance with the present invention, an almost independent control of the two wheels is achieved which are connected to one pressure medium circuit. As it is possible to lock the pressure medium line leading to the non-driven wheel of each brake medium circuit, the brake system of the present invention may also be designed for control of the traction slip to which end only a pressure medium connection must temporarily be establishable from the auxiliary pressure source to the wheel brakes of the driven wheels, and independently of the application of the brake.

According to an advantageous embodiment of the present invention, the braking pressure generator has a brake booster fed by the auxiliary pressure source, to the brake booster one of the two pressure medium circuits being directly connected and the brake booster acting on a master cylinder whose working chamber is connected with the pressure medium circuit; the braking pressure generator having a pressure medium line which connects the brake booster with the master cylinder and into which pressure medium line a normally locking multi-directional valve is inserted which may be switched over into the open position; and, for traction slip control, the auxiliary pressure source instead of the brake booster being connectable to the pressure medium circuit normally directly connected with the brake booster and to the pressure medium line leading to the master cylinder.

BRIEF DESCRIPTION OF THE DRAWING

Further characteristics, advantages, and applications of this invention will become evident from the following description of examples of embodiments, reference being made to the accompanying figures wherein.

DETAILED DESCRIPTION

Figure 1:
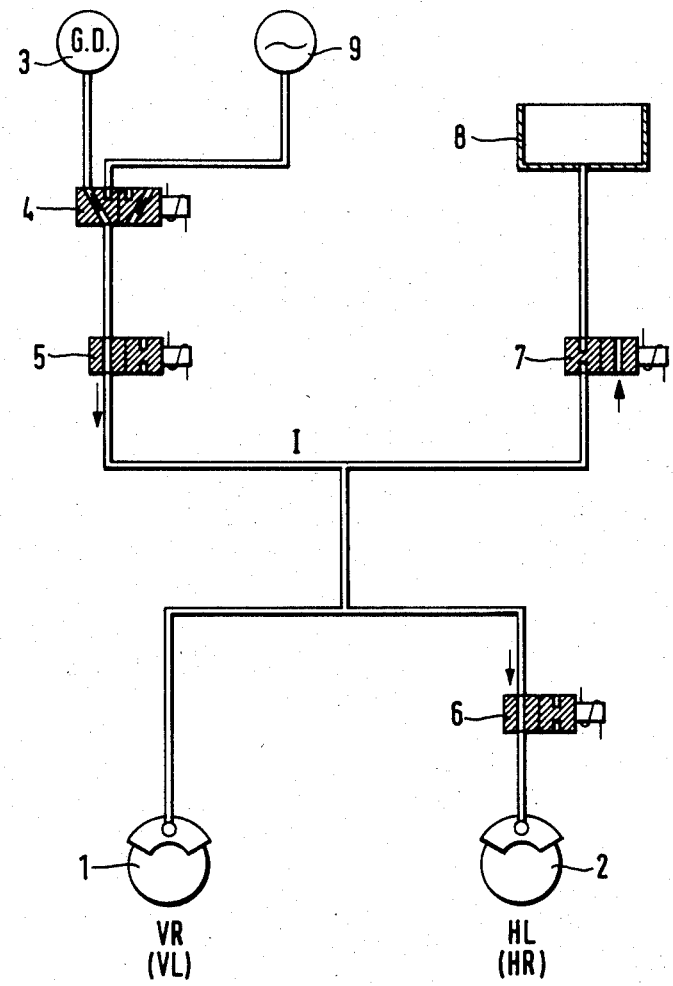
FIG. 1 is the hydraulic connection diagram of a pressure medium circuit of a brake system with diagonal connection of the wheel brakes in accordance with the present invention; and, FIG. 2 is the hydraulic connection diagram of the two pressure medium circuits of a slip-controlled brake system in combination with a special braking pressure generator.

According to FIG. 1, the two wheel brakes 1, 2 of a front wheel VR and of the diagonal rear wheel HL are connected to a source 3 by way of several electromagnetically operable multi-directional valves, said source 3 supplying controlled pressure (G.D.). in this case, the pressure source 3 symbolizes a braking pressure generator, e.g., a brake booster or a master cylinder.

As long as the multi-directional valves are not energized and thus are in their initial or rest positions there exists a pressure medium connection from the pressure source 3 to the wheel brake of the front wheel 1 via a 3/2-way valve 4, a 2/2-way valve 5, the so-called inlet valve. Via a further, likewise "normally" open 2/2-way valve 6, the diagonal rear wheel 2 is also connected to this pressure medium circuit.

For the purpose of reducing an excessive braking pressure which might cause one or both wheels to lock, in the brake system according to FIG. 1, a common 2/2-way valve 7, a so-called outlet valve, is provided which, after switching-over, opens a passage for the pressure medium towards a pressure compensation reservoir 8.

By means of the additional valve 6 it is possible to adjust the braking pressure in the brakes of the wheels 1, 2 to different values. A higher braking pressure at the front wheel 1 as compared with that one at the rear wheel 2 may be achieved by (temporary) energizing of the valve 5 or rather by locking of the pressure medium line by means of said valve 6. A higher braking effect at the rear wheel 2 likewise may be established by a first building up pressure via the valves 4, 5, 6 and by then reducing the braking pressure in the front wheel 1 down to the desired level after switching-over of the valves 6 and 5 and after the energizing of the outlet valve 7. Due to the switching-over of the valve 6, the braking pressure will remain constant at the wheel 2 during this pressure reduction phase.

In combination with the connection provided after the switching-over of the 3/2-way valve 4 and leading to the auxiliary pressure source 9, the valve 6 does not only enable a more precise and independent control of the slip in the wheels 1, 2 during the brake application but also a limitation of the traction slip. To this end it is necessary to insert the additional valve 6 into the pressure medium line leading to the non-driven wheel, in this case, i.e. to the rear wheel 2. In case of excessive traction force it is thus possible to supply braking pressure to the wheel brake of the driven front wheel 1 from the auxiliary pressure source 9 via the switched-over 3/2-way valve 4 and the inlet valve 5 after, previously, the valve 6 was energized and thereby switched over into the locking position.

For the dosage of the braking pressure during control of the traction slip, just as for dosage of the pressure in case of a lock-up danger, the switching times of the valves 4 through 7 are varied. The electronics for the control of the valves in dependence on the rotational behavior of the wheels and on the desired braking pressue variation are not the subject matter of this invention and thus have been left out of the drawing.

Figure 2:
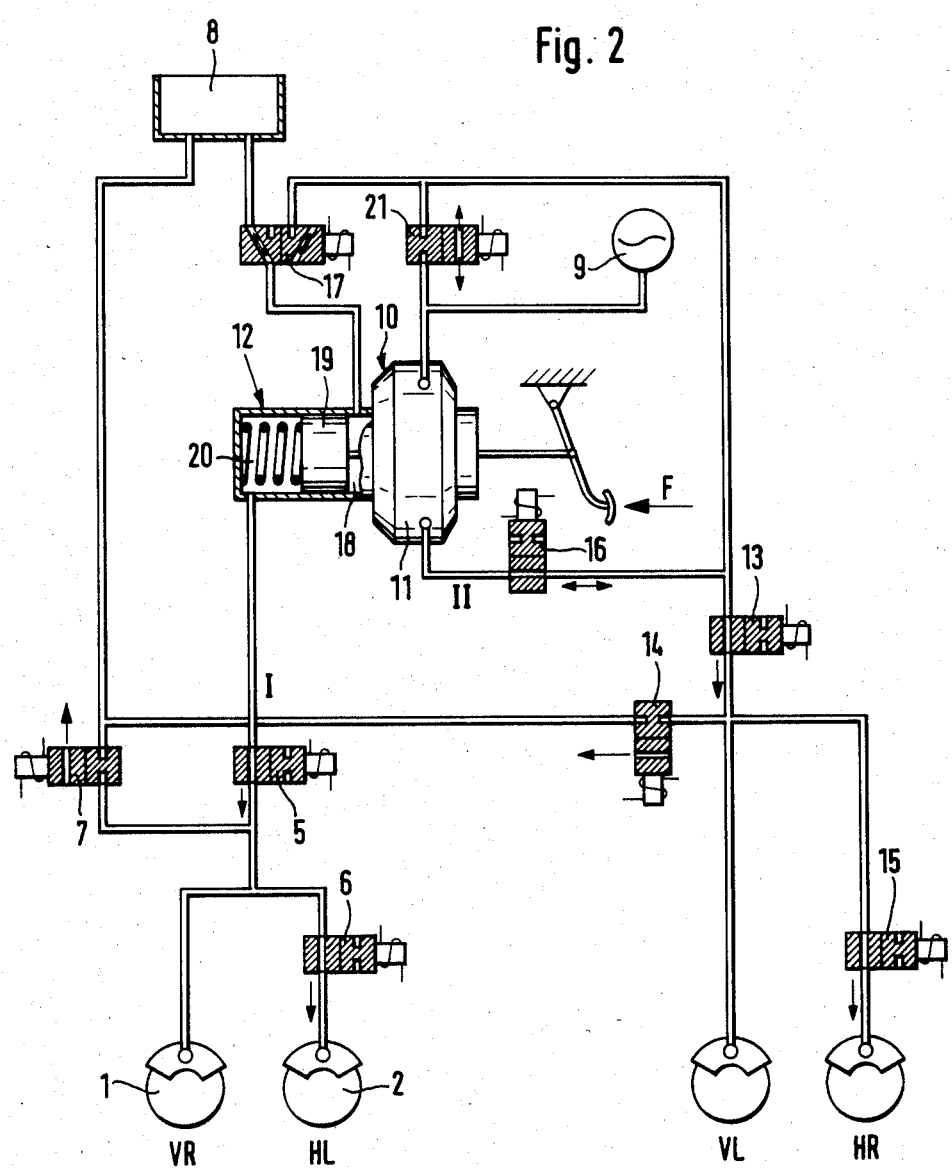

FIG. 2 shows further details of a brake system of the inventive type. As the arrangement according to FIG. 1 could be considered to be the pressure medium circuit I of the brake system according to FIG. 2, the same reference numerals as in FIG. 1 were used for comparable parts.

The braking pressure generator 10 of the system according to FIG. 2 consists of a hydraulic brake booster 11 to which the second diagonal circuit II is directly connected and which acts on a master cylinder 12. Brake booster 11 and master cylinder 12 are structurally combined in this system. The braking force F is exerted on the braking pressure generator 10 by way of the outlined pedal.

The second diagonal II leading to the left-hand front wheel VL and to the right-hand rear wheel HR is, just as circuit I, connected via a 2/2-way valve 13 serving as inlet valve and has a pressure medium line towards the compensation reservoir 8 via an oulet valve 14, said pressure medium line normally being locked. Inserted into the pressure medium line towards the non-driven wheel, the rear wheel HR, is a normally open valve 15. In terms of function, the valves 13, 15, 14 of circuit II correspond to the described valves 5, 6, 7 of circuit I.

The auxiliary pressure source 9 is connected to the brake booster 11. The pressure fed into the pressure medium circuit II depends on the amount of the pedal force F.

Further, for the dynamic supply of pressure from the brake booster 11 into the master cylinder 12, a pressure medium line is provided which leads via a normally open 2/2-way valve 16 and a 3/2-way valve 17. Within the master cylinder, the pressure is introduced, e.g. via a prechamber, into a chamber 18 on the rear side of the master cylinder piston 19; said chamber 18 may be connected with the working chamber 20 of the master cylinder 12 e.g. via a (not shown) non-return valve in the gasket of the master cylinder piston 19 in such a manner as to ensure that the pressure fed into the chamber 18 is passed on into the working chamber 20 and, via the same, into the pressure medium circuit I and, ultimately, to the wheel brakes 1, 2.

For control of the traction slip, in a dual-circuit brake system with diagonal allocation of the wheels, pressure must be supplied from the auxiliary pressure source 9 into the two pressure medium circuits I, II. This may be realized in a particularly simple manner and with very low expenditure according to the connection diagram shown in FIG. 2. To this end, via a normally locked 2/2-way valve 21, the auxiliary pressure source 9 is connected downstream of the valve, which in this phase is switched over into the locking position, to the diagonal pressure medium circuit II and, at the same time, to the pressure medium line leading to the master cylinder 12 via the valve 17. By switching-over of the valves 21, 17 (and by locking of the valve 16) thus also a pressure medium connection is established from the auxiliary pressure source to the pressure medium circuit I via the chambers 18, 20. After switching-over of the two halves 6, 15 leading to the wheel brakes of the non-driven wheels it is possible to supply braking pressure to the wheel brakes of the driven front axle (VR, VL) for the control of the traction slip, said supply being effected in a dosed manner by means of the control of the inlet valves 5 and 13.

What is claimed is:

1. A slip-controlled brake system for automotive vehicles with a driven axle and a non-driven one, with a braking pressure generator connected to an auxiliary pressure source, to said braking pressure generator the wheel brakes of a front wheel and of a rear wheel are connected by way of two separate pressure medium circuits, with wheel sensors and electronic circuits for the detection of the rotational behavior of the wheels and the vehicle's velocity and for the generation of braking pressure control signals, with a normally open inlet valve each which is provided in the pressure medium line from the braking pressure generator to the two associated wheel brakes, and with a normally locking outlet valve which after switching-over into the open position connects the pressure medium line, which leads to the two wheel brakes, with a pressure compensation reservoir, wherein in each brake circuit (I, II) a normally open multi-directional valve (6, 15) is inserted into the pressure medium line leading to the wheel brake of the non-driven wheel (HL, HR), after switching-over said normally open multi-directional valve (6, 15) locking the pressure medium line;

wherein at least one multi-directional valve (4, 16, 17) are inserted in one of the two brake circuits (I, II) upstream of the inlet valve (5, 13) into the pressure medium lines leading to the wheel brake of both one rear wheel and one front wheel, for the purpose of controlling the traction slip the auxiliary pressure source (9) being connectable to the pressure medium circuits (I, II) by means of said multi-directional valves (4, 16, 17), said valve (17) and the connection of a master cylinder prechamber (18) to said pressure source (9) and said reservoir; and, wherein the braking pressure generator (10) includes a brake booster (11) fed by the auxiliary pressure source (9), one of the two pressure medium circuits (II) being directly connected to said brake booster (11) and said brake booster (11) acting on a master cylinder (12) whose working chamber (20) communicates with the other pressure medium circuit (I); wherein the braking pressure generator (10) has a pressure medium line leading from the brake booster (11) to said master cylinder prechamber (18), another multi-directional valve (17) is inserted into said pressure medium line which is switchable from a position to connect said pressure source to said prechamber to a position to connect said prechamber to said reservoir; said multi-directional valves (4, 16, 21) connected to the auxiliary pressure source (9) for traction slip control and further connected to one of the pressure medium circuits and to the pressure medium line leading from the brake booster (11) to the master cylinder (12).

2. A brake system as claimed in claim 1, wherein said multi-directional valves (4, 16, 21) by which the auxilary pressure source (9) is connected to one of the brake circuits (II) and to the pressure medium line leading to the master cylinder (12) include two 2/2-way valves (16, 21), a valve (21) locking in the rest position and a valve (16) open in the rest position.

3. A brake system as claimed in claim 1, wherein said another multi-directional valve (17) includes a 3/2-way valve provided for connecting the auxiliary pressure source (9) to the pressure medium line, which leads to the master cylinder (12), and to the pressure medium circuit (II) normally connected to the brake booster (11).

* * * * *